(12) United States Patent
Steinke et al.

(10) Patent No.: US 7,377,596 B2
(45) Date of Patent: May 27, 2008

(54) URETHANE WHEEL HAVING A METAL CORE

(75) Inventors: Richard A. Steinke, Boulder City, NV (US); Theodore M. Love, Las Vegas, NV (US); James G. Moore, Boulder City, NV (US)

(73) Assignee: Amerityre, Boulder City, NV (US)

( * ) Notice: Subject to any disclaimer, the term of this patent is extended or adjusted under 35 U.S.C. 154(b) by 279 days.

(21) Appl. No.: 11/116,633

(22) Filed: Apr. 29, 2005

(65) Prior Publication Data
US 2006/0244304 A1    Nov. 2, 2006

(51) Int. Cl.
*B60B 5/02* (2006.01)
(52) U.S. Cl. ............... 301/64.703; 301/64.702
(58) Field of Classification Search ........... 301/35.326, 301/64.701, 64.702, 64.703, 64.705, 65, 301/35.626
See application file for complete search history.

(56) References Cited

U.S. PATENT DOCUMENTS

| | | | | |
|---|---|---|---|---|
| 1,639,827 A | * | 8/1927 | Wayne | ............... 152/6 |
| 3,253,862 A | * | 5/1966 | Watanabe et al. | |
| 3,357,747 A | * | 12/1967 | Eldred | ............. 301/64.706 |
| 3,528,706 A | * | 9/1970 | Bauer | |
| 3,811,737 A | * | 5/1974 | Lejeune | |
| 3,987,832 A | * | 10/1976 | Funke | ............... 152/310 |
| 4,072,358 A | * | 2/1978 | Ridha | ............. 301/64.703 |
| 4,100,247 A | * | 7/1978 | Shead et al. | |
| 4,217,944 A | * | 8/1980 | Pascal | |
| 4,295,256 A | * | 10/1981 | Pascal | ............... 29/894.32 |
| 4,416,926 A | * | 11/1983 | Maglio | |
| 4,527,839 A | * | 7/1985 | Fujitaka et al. | ......... 301/64.705 |
| 4,573,894 A | | 3/1986 | Blayne et al. | |
| 4,749,235 A | * | 6/1988 | McDougall | ............. 301/64.703 |
| 4,900,097 A | * | 2/1990 | Kostov et al. | |
| 5,026,106 A | * | 6/1991 | Biermann | |
| 5,133,591 A | * | 7/1992 | Skaggs et al. | ......... 301/64.704 |
| 5,152,951 A | | 10/1992 | Ahmad et al. | |
| 5,236,027 A | * | 8/1993 | Lu | ............... 152/250 |
| 5,401,079 A | * | 3/1995 | Rooney | |
| 5,564,793 A | * | 10/1996 | Whiteford | |
| 5,743,316 A | * | 4/1998 | Chrobak | ............... 152/12 |
| 6,325,462 B1 | * | 12/2001 | Hummel et al. | |
| 2004/0036348 A1 | * | 2/2004 | Schroeder | |
| 2005/0121970 A1 | * | 6/2005 | Adrian | |
| 2005/0134105 A1 | * | 6/2005 | Thompson | ............... 301/5.1 |

\* cited by examiner

*Primary Examiner*—Russell D Stormer
(74) *Attorney, Agent, or Firm*—M. Reid Russell

(57) ABSTRACT

A urethane wheel that is manufactured by molding, casting, or vacuum forming methods in a mold having a wheel shaped cavity that a wheel core formed from a rigid material such as steel or aluminum has been supported in to receive a flow of a urethane material directed therearound, encapsulating the entire wheel core and forming a wheel capable of supporting a car or light truck traveling at highway speeds.

6 Claims, 13 Drawing Sheets

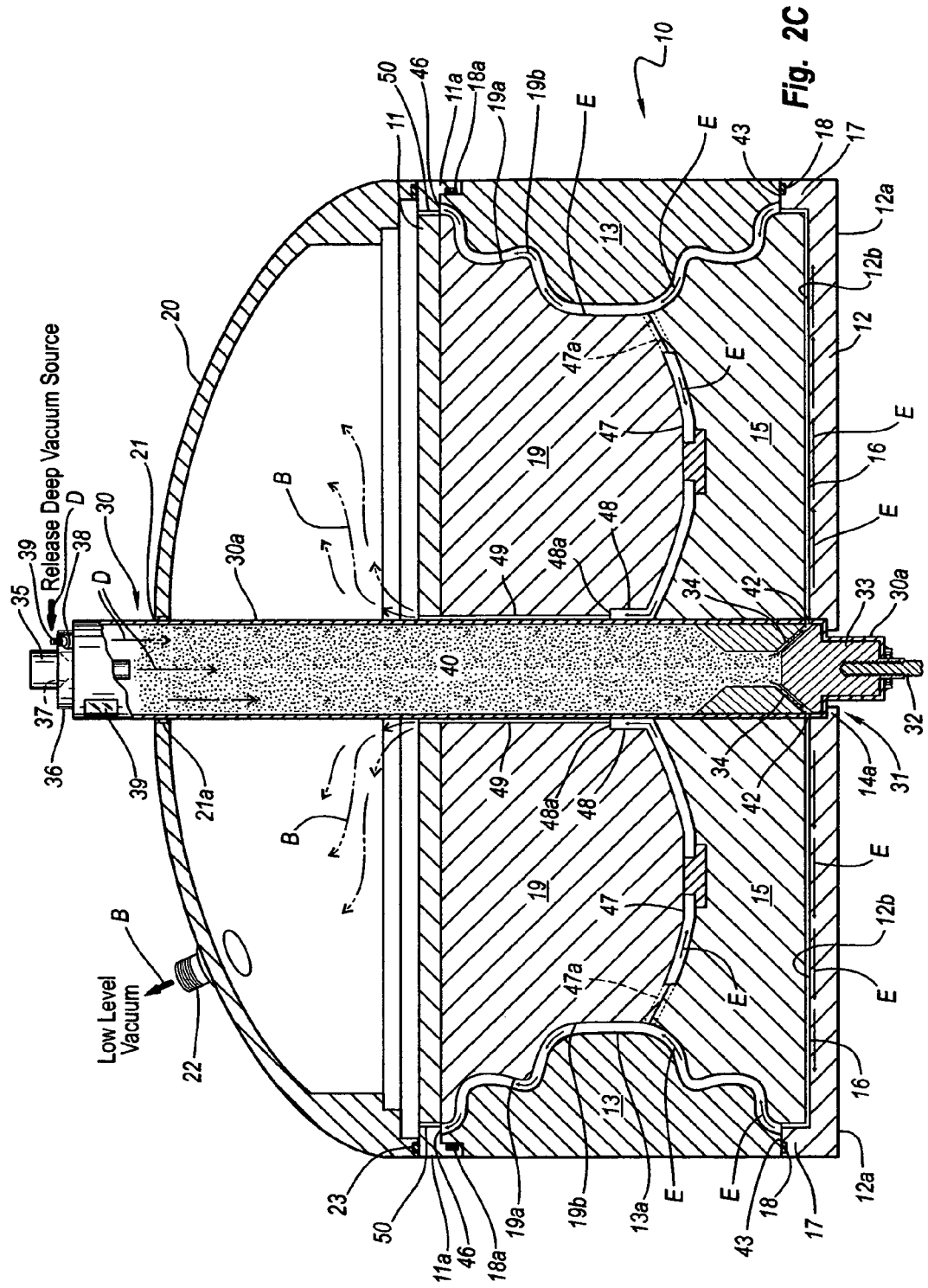

URETHANE WHEEL HAVING A METAL CORE

BACKGROUND OF INVENTION

1. Field of the Invention

This invention pertains to methods and apparatus for vacuum forming a vehicle wheel from a mixture of urethane constituents.

2. Prior Art

The present invention is in a wheel that is formed from a urethane material in a vacuum forming apparatus in a single casting operation to have at least the strength, or greater, of a like size and load bearing standard steel or aluminum wheel for mounting a tire thereon. The vacuum forming apparatus includes a mold having a cavity wherein is formed a wheel. Or the cavity is formed to accommodate a wheel core fitted therein, that is preferably formed from a light gauge steel or appropriate aluminum compound, and is supported in the mold by spacers to receive a urethane coating. In practice, a urethane material, that is a compound formulated to produce a steel like strength, is pulled under vacuum into a mold cavity. Whereby, after curing, the mold is opened and a homogenous wheel, or a wheel containing a core, is removed.

Relating to vacuum forming apparatus, heretofore it was recognized that venting air from a tire tread mold cavity early in a casting process could eliminate the necessity for venting the cavity through spaced holes in the mold that materials from the tread will flow into during casting and form projections or "tits". Such extensions or "tits" project from the tread surface and were either pulled off when the tire was removed from the mold, had to be cut off or wore off during tire use. To prevent this undesirable cosmetic anomaly it was recognized that air could be vented from the mold cavity just before tread casting, eliminating a necessity for providing flow passages or vents from the tire tread mold while still obtaining a smooth, un-pocketed or un-blemished, finished tread surface. Examples of such an introduction of a vacuum into a tire mold just prior to forming a tire tread are shown in U.S. Pat. Nos. 4,573,894 and 5,152,951. Specifically, U.S. Pat. No. 4,573,894 sets out a tire mold having a cavity that is for receiving and finally shaping the tire. The patent is defined by a surface that is for contacting the exterior of the tire during tire curing. The cavity is fluid connected to a single vacuum source for evacuating air from within the cavity during an early portion of a tire curing cycle to prevent air and any other fluid from becoming trapped between the tire and the surface that defines the cavity that will become the tire tread. Visual effects in the form of voids in the tire exterior are, thus eliminated. Like the '894 patent, U.S. Pat. No. 5,152,951 also provides for the elimination of fluid from the mold cavity during an early portion of a tire curing cycle. The patent provides for fluid evacuation through a space between the surfaces of the mold parts that defines the mold parting line. Both patents provide a single vacuum source and its connection to the mold cavity for forming the tire side wall and tread surfaces.

Recently, the inventors of the present invention developed an improved vacuum forming apparatus for forming transport tires that is the subject of a currently pending U.S. patent application Ser. No. 10/936,635, filed Sep. 4, 2004. This patent application sets out an apparatus and method for forming an elastomer tire containing plies, belts and beads, that involves both an evacuation of air from the elastomeric mixture prior to its introduction into the mold cavity, and for pulling the air free mixture through the mold. Which air free flow of elastomeric material fills an area between inner and outer mold walls and travels through the core of plies, belts and beads, to form a finished transport tire that is free of voids or pockets. Unlike this earlier patent application the present invention provides for vacuum forming a homogenous wheel or a wheel core having an outer coating of a urethane material bonded thereto.

SUMMARY OF THE INVENTION

It is a principal object of the present invention to provide for forming, in a vacuum forming apparatus, a homogenous wheel from, or coating a wheel core with, a urethane material to provide, after curing, an essentially perfectly balanced urethane wheel that has a strength that is the equivalent to, or better than a steel wheel formed for a like application and load bearing.

Another object of the present invention is to provide for forming, in a single operation, a wheel from, or coating a wheel core with, a urethane material in a vacuum apparatus where air is removed from the urethane material mixture prior to its passage into an apparatus mold and the urethane material is pulled, under vacuum, through the mold, filling a mold cavity to form a homogenous wheel, or to form a wheel having a core formed from aluminum or a light gauge steel.

Another object of the present invention is to provide for forming, in a single operation, a wheel from, or coating a wheel core with, a urethane material, to provide a wheel that, when cured, has a like or better strength than a steel or aluminum wheel formed for a like application and load bearing, in a vacuum casting apparatus that includes a canister that is initially placed under a deep vacuum as it receives a volume of mixed urethane constituents, with the vacuum pulling air from the mixture, and whereafter the canister is opened to atmosphere and the column of the air-free mixture is allowed to pass through a canister exhaust valve and travel into a mold cavity formed between inner and out wheel mold surfaces that is maintained at a low-level vacuum, with the low level vacuum pulling the air-free urethane mixture through the core, filling the mold cavity, and is allowed to cure into a homogeneous finished wheel.

Another object of the present invention is to provide a mold with a wheel cavity having opposing top and bottom plate faces that are mirror images of opposing surfaces of a wheel, and where the mold is assembled around a cylindrical inner core and with half ring outer mold segments fitted between the top and bottom plates to form a wheel center between inner and outer wheel flanges, land with the mold arranged as a component of a vacuum forming apparatus.

Another object of the present invention is to provide for forming a homogenous wheel or wheel containing a core in a vacuum forming apparatus from a urethane material where, in the formation process, essentially all air is removed from a urethane material mixture before its passage into a mold wherethrough the material is pulled, under a low level vacuum, to completely fill the mold and flow around a wheel core, if one is positioned therein and maintained on spacers, forming, in a single molding operation, a wheel that is ready for removal from the mold after cooling.

Still another object of the present invention is to provide a vacuum forming apparatus for manufacturing a homogenous wheel, or wheel with a core, from a urethane material, where the vacuum forming apparatus includes a reservoir canister, that is preferably located within the mold annular area, but may be connected into a mold cavity through a hose, or the like, and which mold cavity mimics the inner and outer surface of a wheel and is under a low-level vacuum, and with the reservoir canister maintained under a deep vacuum whereby such air as is trapped in a urethane mixture of constituents poured into the canister are removed, whereafter, a canister valve is opened and the air-free urethane material mix is pulled into the mold cavity by the low-level vacuum, forming a homogenous wheel, or when a wheel core is positioned in the mold cavity prior to mold closure, forming a wheel with an encapsulated core.

Still another object of the present invention is to provide a vacuum forming apparatus for forming a wheel from a urethane material, where the apparatus includes seals for maintaining the integrity of a urethane canister and the mold when they are subjected, respectively, to a deep vacuum and a low level vacuum.

Still another object of the present invention is to provide a vacuum forming apparatus for casting a homogenous wheel or wheel containing a core from a urethane material in a single operation, producing a wheel that is essentially perfectly balanced.

The present invention is in wheel formed from a mixture of urethane material constituents in a vacuum forming apparatus connected to pass a urethane material flow into a mold. The mold is assembled from components to have a cavity that is the shape of a wheel, and may provide for receiving standoffs or spacers fitted into the mold to support a wheel core. The mold cavity receives a flow of a mixture of urethane material constituents that are selected to provide, when cured, a strength that is like that or better than a steel or aluminum wheel formed to support a design load that is like the load to be supported by the urethane wheel of the invention. The urethane constituents mixture are poured into a canister that is maintained under a deep vacuum to remove the air from the mixture, and whereafter that canister is opened to pass an air free flow into to fill the mold wheel cavity that is under a low level vacuum, flowing throughout the cavity, forming a homogenous wheel. Or, where the mold cavity contains a wheel core, preferably one formed from light gauge steel or suitable aluminum, that is to be coated or encapsulated in the wheel by the flow of urethane material that is pulled through the mold cavity to form the wheel. The mold includes inner and outer mold components that, when assembled form the mold with a cavity that has the shape of a wheel to be cast therein.

The mold includes a sleeve as a wheel hub area, arranged between top and bottom plates that have the shape of the opposite sides of the wheel, with a pair of half ring outer mold segments assembled as a ring positioned between the top and bottom plates that form a mirror image of the wheel across the flange area. Which outer mold segments and top and bottom plates include seals for closing off the mold cavity, with the outer mold segments to be easily removed when the mold top plate is lifted off the mold assembly, and the half ring outer mold segments separated, allowing for removal of a cast wheel.

For vacuum forming the wheel, the vacuum forming apparatus includes a mold canister that may, but need not, be formed to fit across the mold hub area that is to receive a mix of urethane material constituents and connects to a deep vacuum source for removing air from which mix. After air removal, the urethane mixture is passed through a needle valve into an annular mold cavity area, flowing across the mold cavity to the hub area, and across the outer mold segments, traveling from one wheel flange end to the other, under the urging of a low level vacuum that is pulled through a dome shaped lid that is fitted over the mold top plate. The urethane material mixture is thereby pulled through the mold, filling the cavity from a wheel hub area to the wheel outer flange area. Further, if a wheel core is contained in the mold, it is preferably supported on standoffs or spacers, that allow the flow to encapsulate the core. Additional to the seals between the mold top and bottom plates and the mold outer segments, seals are also provided between the individual outer mold segments, around the mold hub area, and around the canister, if the canister is arranged across the mold hub area. Which seals contain, respectively, the low level and deep vacuums that are preferably generated by separate vacuum sources.

Upon receipt of a set volume of the urethane material mixture the canister is sealed and is subjected to a deep vacuum. The vacuum is pulled through a port in the canister, and is operated until the mix in the urethane mixture in the canister is essentially free of all the air that had been trapped therein during the mixing process. Thereafter, with the mold maintained under a low level vacuum that is pulled through ports at the wheel hub area and the wheel flange ends that open into the cover, the canister, is opened through a needle valve to pass the urethane mixture into the mold cavity, and the canister itself is open to outside air. The air free urethane mixture thereby flows into the mold wheel cavity. The urethane mixture fills the mold wheel cavity, encapsulating a wheel core, if any, mounted therein. With any air in the mold traveling ahead of the mix flow and out the outer mold ports wherethrough the low level vacuum is being pulled. In practice, the needle valve is required to be closed as the canister emptied and comes under ambient air conditions as are present in the canister, with a presence of the urethane mixture at the dome shaped lid ports to indicate that the mold rim cavity has been filled. Then, after cooling, the mold is broken open and a completed wheel is removed that is essentially perfectly balanced.

DESCRIPTION OF THE DRAWINGS

The invention may take physical form in certain parts and arrangement of parts, used to form the apparatus of and practice the steps of the invention that are herein shown as a preferred embodiment and will be described in detail in this specification and illustrated in the accompanying drawings which form a part hereof:

FIG. 2C shows a view like that of FIG. 2B only showing the cylindrical canister filled with mixed urethane constituents wherefrom air has been removed and the deep vacuum source has been released with the canister open to atmosphere, arrow D, and showing the needle valve as being opened to pass a urethane mixture therefrom that travels through the mold cavity, as illustrated by arrows E, to exhaust into the space under the dome shaped lid;

DETAILED DESCRIPTION

Figure 1A:
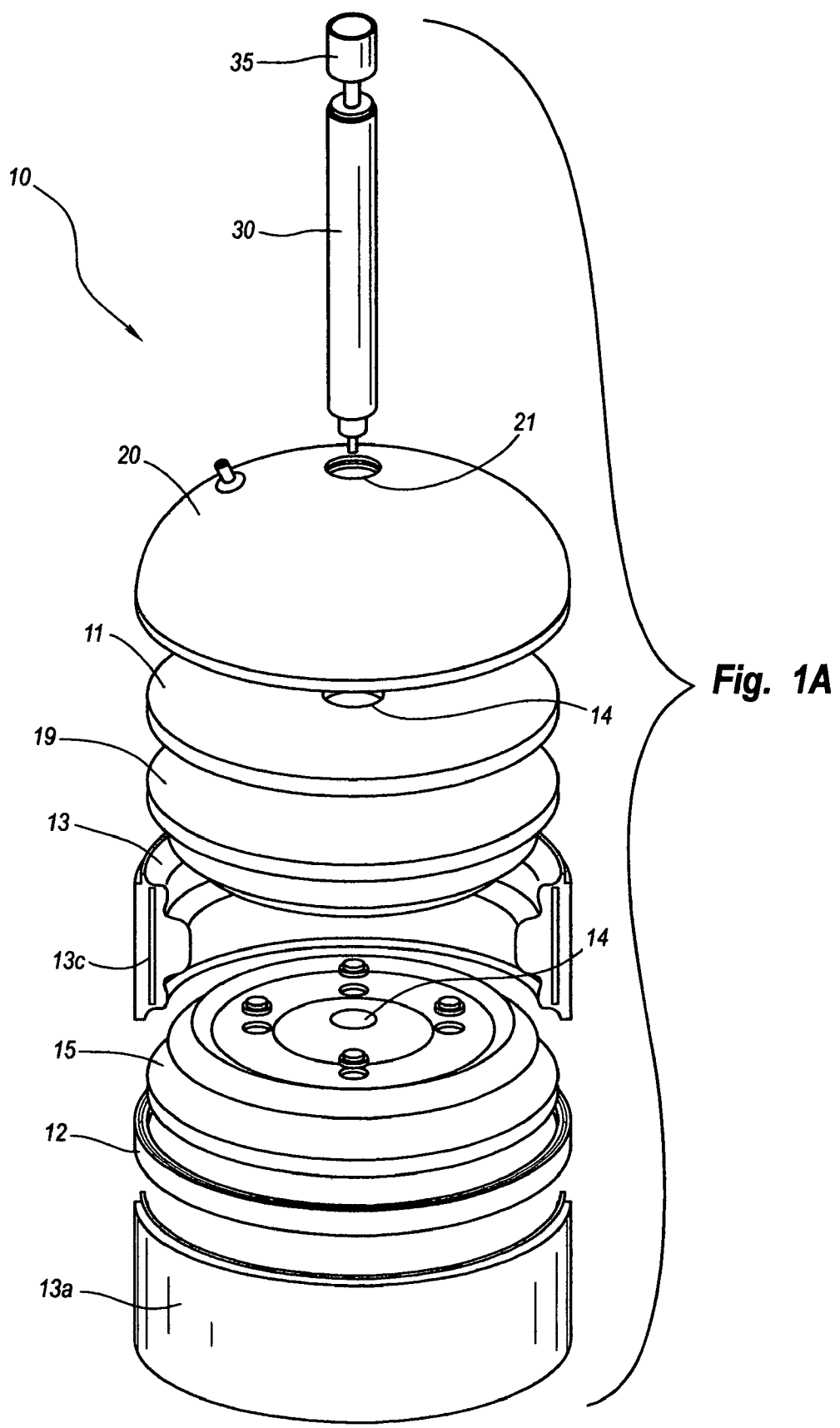
FIG. 1A shows an exploded top plan perspective view of a mold dome over a top plate that each have a center opening that is for fitted onto a ring assembled from half ring outer mold segments that are fitted together and that fitted together ring is positioned on an outer portion of a bottom plate, forming the exterior or outer mold, and showing a cylindrical cavity of a vacuum forming apparatus aligned for fitting through the center openings.
Figure 1B:
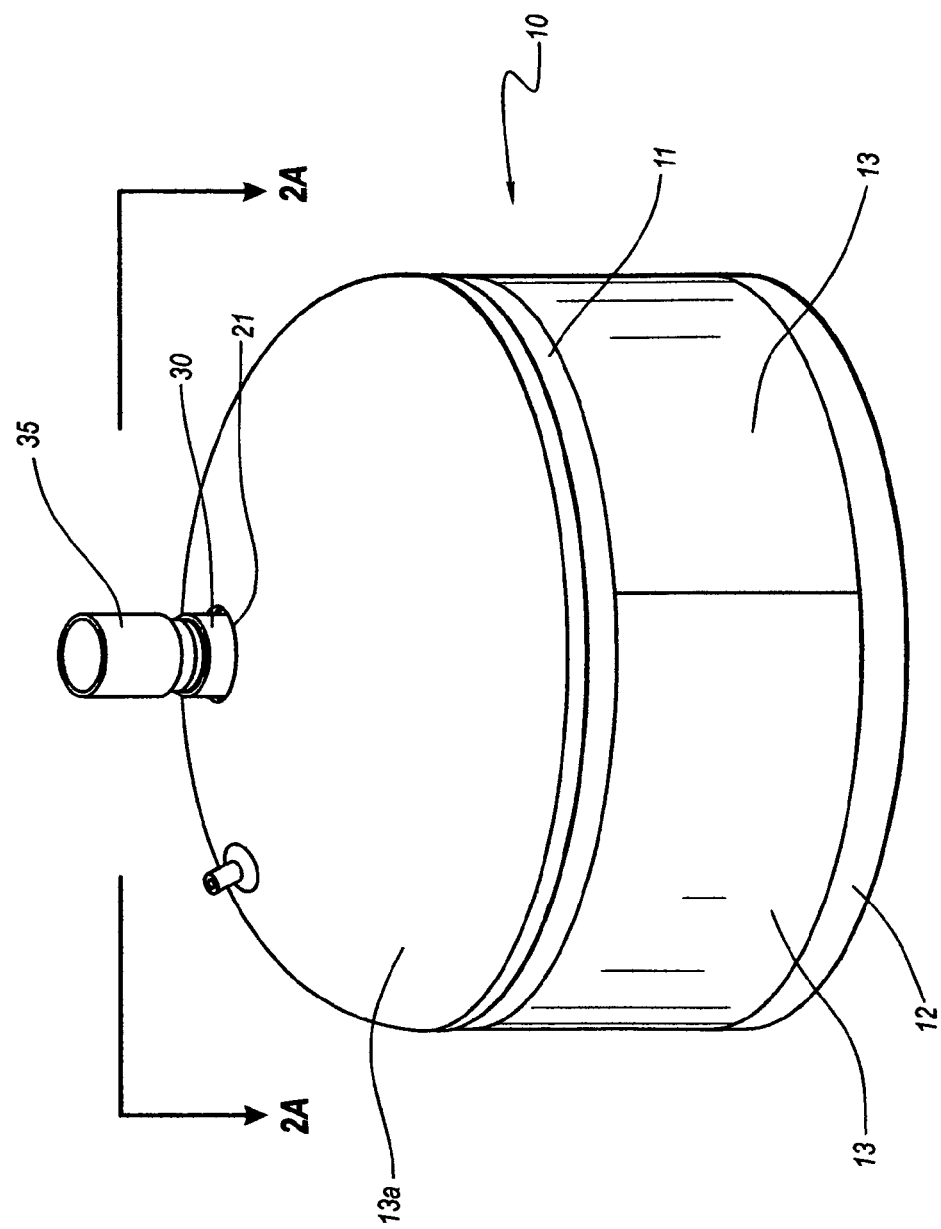
FIG. 1B shows the assembled mold of FIG. 1A fitted with a dome shaped lid across the top plate and including cylinder canister of a vacuum forming apparatus shown fitted through the dome shaped lid and passed into the top plate center opening.

The invention is in a vacuum forming apparatus and process for forming a urethane wheel that may be formed as a homogenous unit from a cured urethane material or may include a wheel core having a cured urethane coating, or includes a wheel core that is entirely encapsulated in the urethane material. For forming a urethane wheel of the invention a mold is provided, as shown in FIG. 1A, identified as a mold 10 that includes a dome shaped lid 20. With the mold 10 shown in FIG. 1B as having had the dome shaped lid 20 fitted thereover and includes a cylindrical canister 30 fitted through an opening through the center of the dome shaped lid and through the mold center. Which cylindrical canister is to hold and dispense a mixture of urethane constituents poured therein and is for fitting through a center opening 14 formed through a top plate 11 of which mold assembly 10 of FIG. 1A.

Figure 2A:
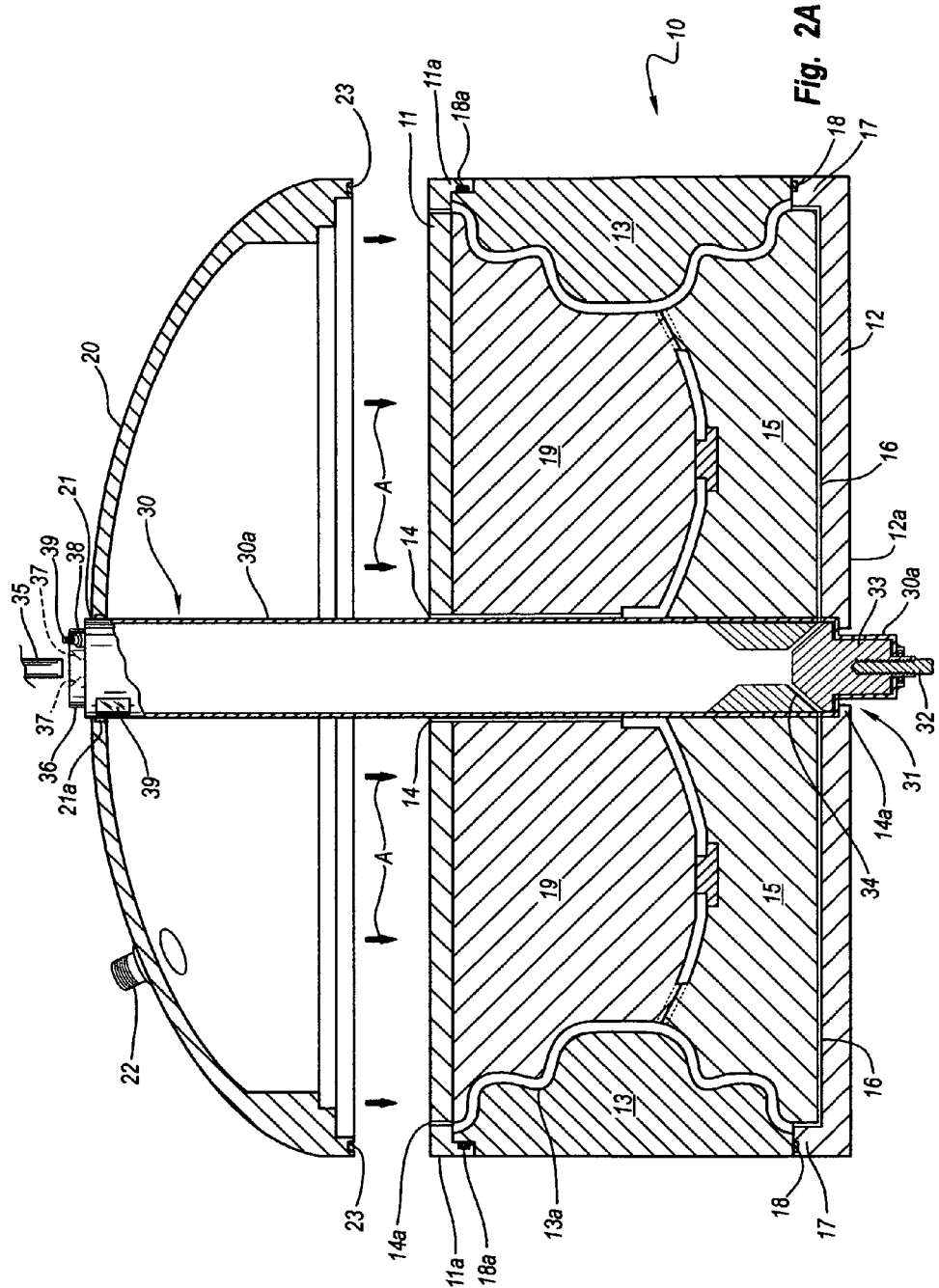
FIG. 2A shows a side elevation sectional view taken along the line 2A-2A of FIG. 1B, showing the dome shaped lid lifted off of the mold top plate, arrows A, indicating that the dome shaped lid is for fitting over the top plate and showing top and bottom plates and outer mold segments as including opposing inner mold core sections forming the mold cavity, and showing the cylindrical canister fitted through the dome shaped lid and top and bottom plates that is open to receive a flow of a urethane mixture through a top end, shown as a section of pipe, and is closed by a needle valve across its lower end and showing first and second ports fitted, respectively, into the top of the cylindrical canister and through the dome shaped lid top surface.
Figure 2B:
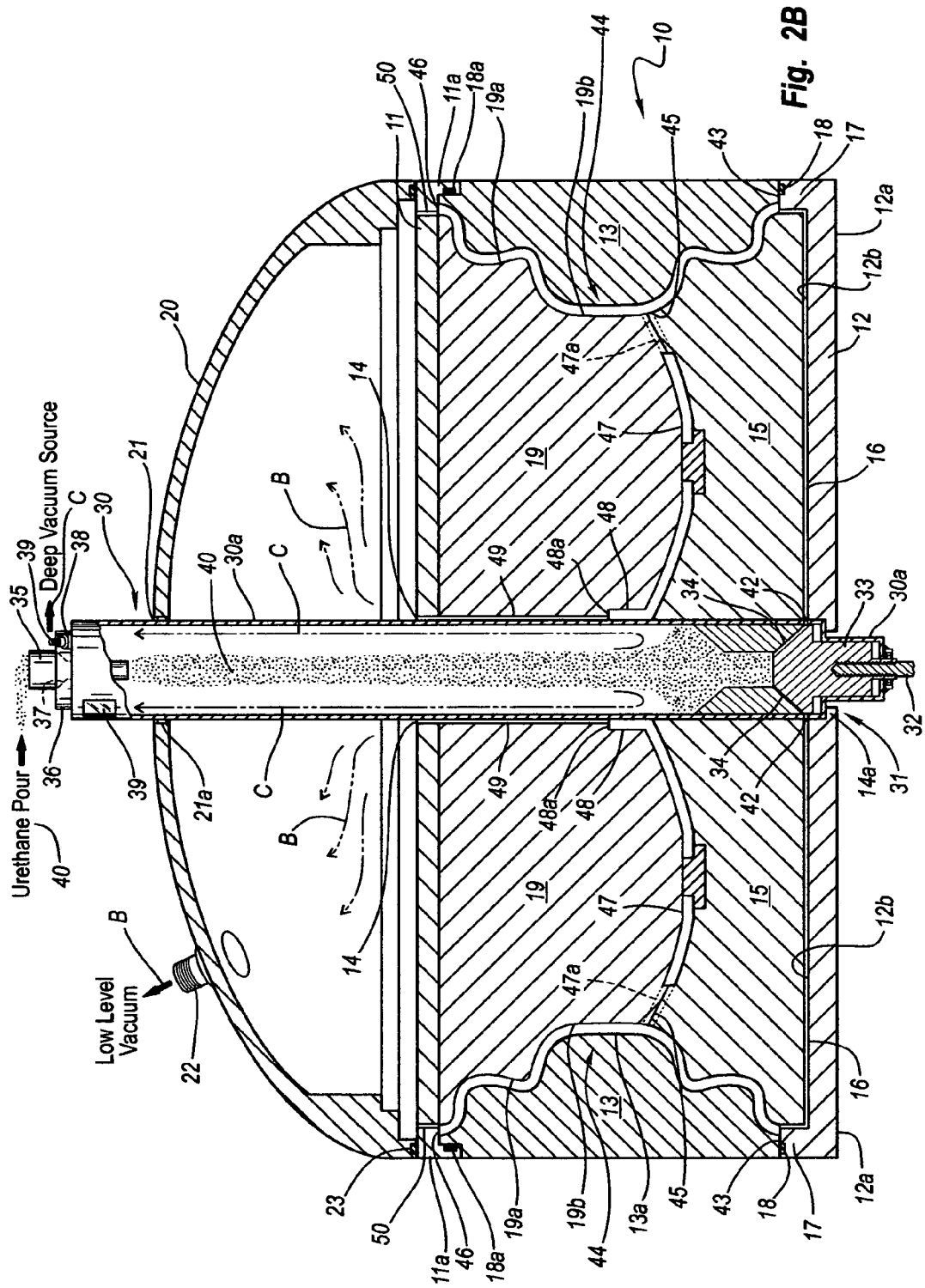
FIG. 2B shows the view of FIG. 2A with the dome shaped lid lowered onto the mold top plate and showing a urethane mixture being poured into the cylindrical canister and with the canister having a deep vacuum, arrow C, pulled therefrom through a deep vacuum port, showing the needle valve as closed and showing a low level vacuum, arrows B, being pulled through a low level vacuum port.

FIG. 2A shows the mold 10 as including the top plate 11 and bottom plate 12, with outer mold half ring segments 13a and 13b aligned for assembly into a ring that is an outer mold segment 13. It should, however, be understood, which outer mold segments may be formed of multiple segments for positioning side by side together to form a ring. The assembled ring is positioned around a bottom plate mold segment 15 that is mounted on top of the bottom plate 12 with end seals 13c for fitting into slots in the opposing half ring segments surfaces provided for sealing the half ring segments at their junctions. Shown in FIG. 2A, number of radial channels 16 are formed in the bottom plate mold segment 15 extending across the bottom plate 12 upper surface 12b, above the center opening 14a to an outer lip 17. Which outer lip 17 has a ring seal 18 fitted thereto that engages a bottom surfaces of the pair of half ring outer mold segments 13a and 13b that form the outer mold segment 13, sealing thereto. With, shown in FIGS. 1A, and 2A through 2C, in mold 10 assembly, after the outer mold segment ring 13 is fitted onto the bottom plate 12 and bottom plate mold segment 15, the top plate 14, mounting a ring shaped top plate mold segment 19 is fitted thereover, engaging a ring seal 18a fitted into a seal groove formed in undersurface of the top plate 11, completing the mold assembly. With, in that assembly, a channel 19b, as shown in FIG. 2B is formed between the outer mold segment 13 and outer edges of the bottom plate mold segment 15 and top plate mold segment 19 that will open into a vent passage 19a, that connects to open into the area beneath the dome shaped lid 20, as shown in FIGS. 1A and 2A through 2D. Which top and bottom plates 11 and 12, respectively, as shown in FIG. 2A have the mold sections 15 and 19 maintained to the respective bottom and top plates, respectively, forming the wheel inner surfaces, and with the outer mold segments opposing inner surfaces having the wheel opposite faces, and include bead seat and flanges formed therein. So arranged, the spaces 19b and 19a between the opposing mold sections and cylindrical canister in the assembled mold, becoming a mold channel wherethough the urethane mixture travels in a single molding operation. Which mold 10, as set out below, includes ring seals 18 and 18a, fitted, respectively, between the contacting surfaces of the bottom of the formed ring outer mold segment 13 and bottom plate 12 edge, and the top of the outer mold segment 13 and a lip 11a of the top plate, as shown in FIG. 2A. Which seals along with seals 13c between the half ring outer mold segments 13a and 13b provide for isolating the urethane material flow paths to fill the mold cavity, as set out and discussed below.

FIG. 2A shows a center opening 21 of the mold dome shaped lid 20 being fitted over and slid along the cylindrical canister 30 outer surface, as the dome shaped lid 20 is lowered onto the top plate 11, as illustrated by arrows A, to fit and cover over the top plate 11. The area under the dome shaped lid 20 is open and is vented from that open area through a vent fitting 22 that is for connection to a low level vacuum source. A ring seal 23 is arranged around the dome shaped lid outer edge for providing dome shaped lid sealing over the top plate 11, as shown in FIG. 2B. With the dome shaped lid 20 maintained under the low level vacuum source, a liquid urethane material is passed from the cylindrical canister 30 to be pulled through the mold cavity and just into the open area under the dome shaped lid, forming a wheel 60, as shown in FIGS. 2E and 3, as set out and discussed in detail below.

As shown in the sectional view of FIG. 2A the cylindrical canister 30 is fitted through the dome shaped lid center hole 21, sealing against a ring seal 21a, and travels through the mold center hole 14, shown in FIG. 1A, that extends from the mold top plate 11 through the mold bottom plate 12. The cylindrical canister 30 lower end extends beyond the mold bottom plate 12 under surface 12a, as shown in FIGS. 2A through 2D as an inverted top hat shaped end 30a wherein is fitted a needle valve 31 having an actuator rod 32 extending axially out from its lower end. The actuator rod 32 is moved vertically as by operation of a solenoid, not shown, to lift or lower a valve head 33 into and out of engagement with a needle valve 31 seat 34, opening and closing the cylindrical cavity through the needle valve to pass a flow of urethane material into the mold 10, as set out below.

A feed tube or pipe 35, shown in FIG. 2A, is installed through a top end 36 of the cylindrical canister 30 that is for passing mixture of urethane material through a funnel shaped opening 37, shown in broken lines. Which pour of urethane material is observable through a window 39. The cylindrical canister 30, as it receives the mixed urethane material, is maintained under a deep vacuum that is pulled through an end 39 of a vacuum fitting 38 maintained in the cylindrical canister top end 36, opening into the cavity between the top plate 11 and dome shaped lid 20 undersurface. The feed tube or pipe 35 is shown aligned with the funnel shaped opening 37 to pass a mixture of urethane constituents 40 into the cylindrical canister 30 as shown in FIG. 2B.

Figure 2D:
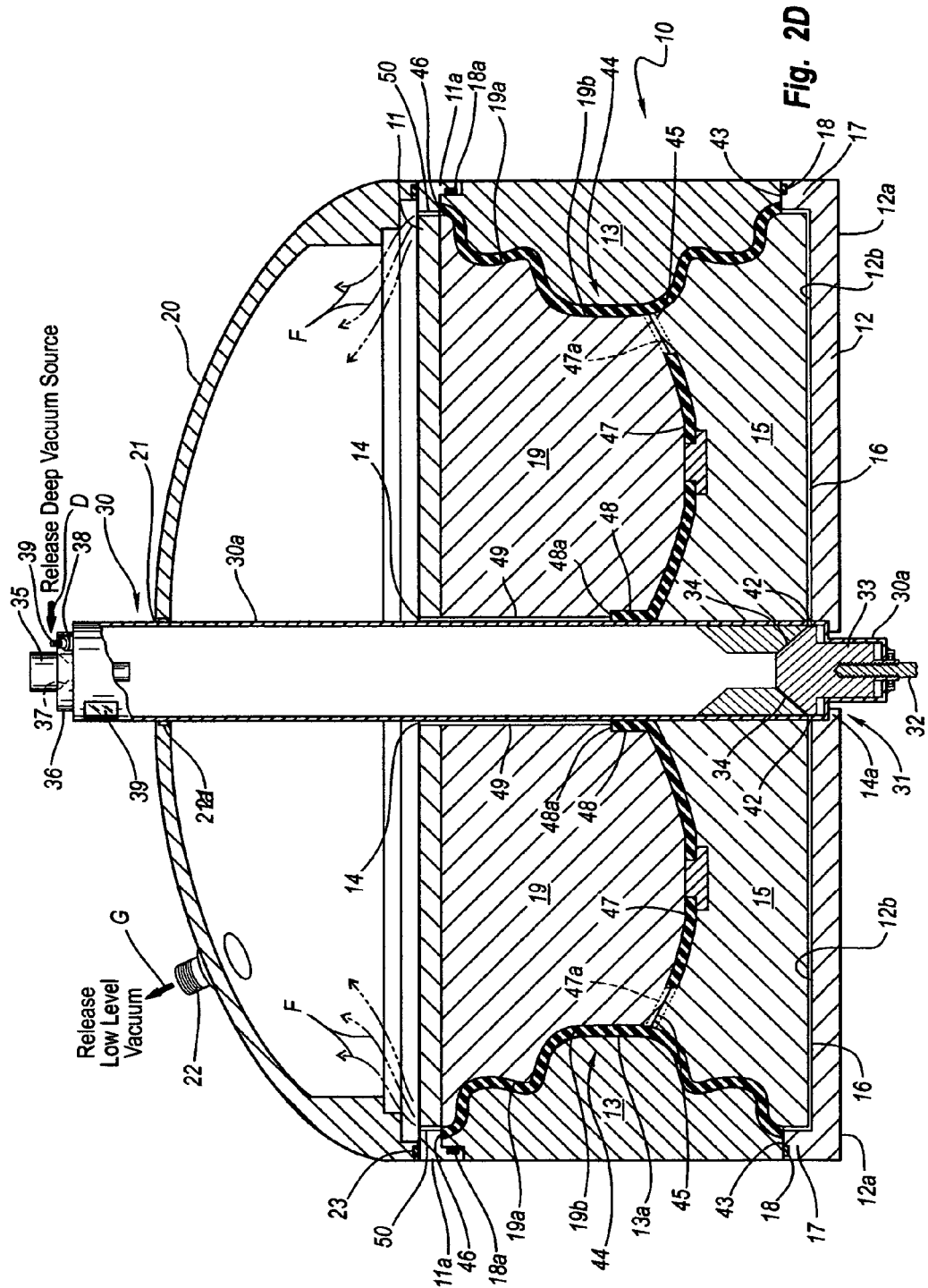
FIG. 2D is a view like that of FIG. 2C only showing the urethane mixture as having been exhausted from the canister and the needle valve closed, with the urethane mixture filling the mold cavity, and about to pass into the area under the dome, arrows F.
Figure 2E:
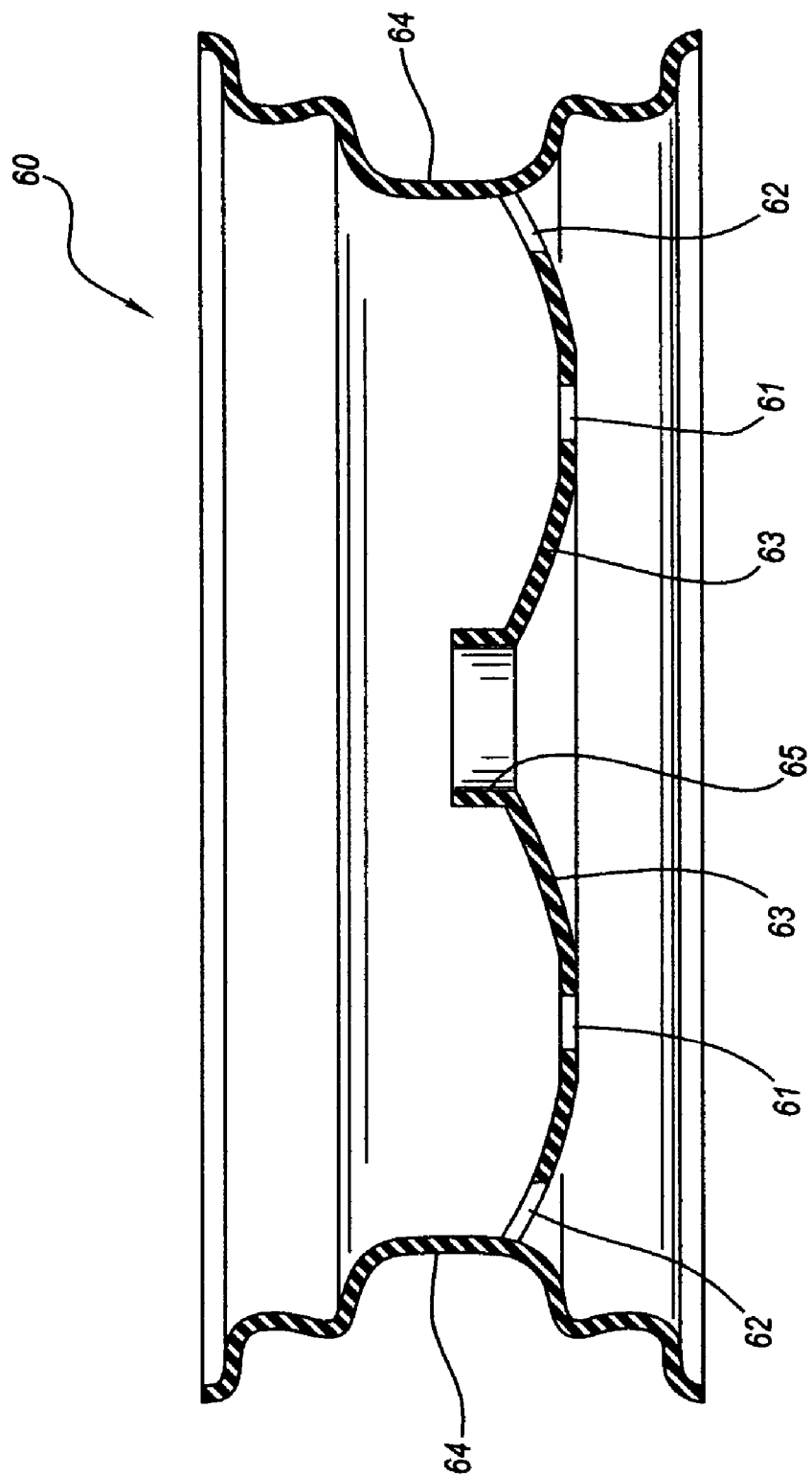
FIG. 2E shows a side elevation sectional view of a homogenous wheel as has been removed from the mold of FIG. 2D.
Figure 3:
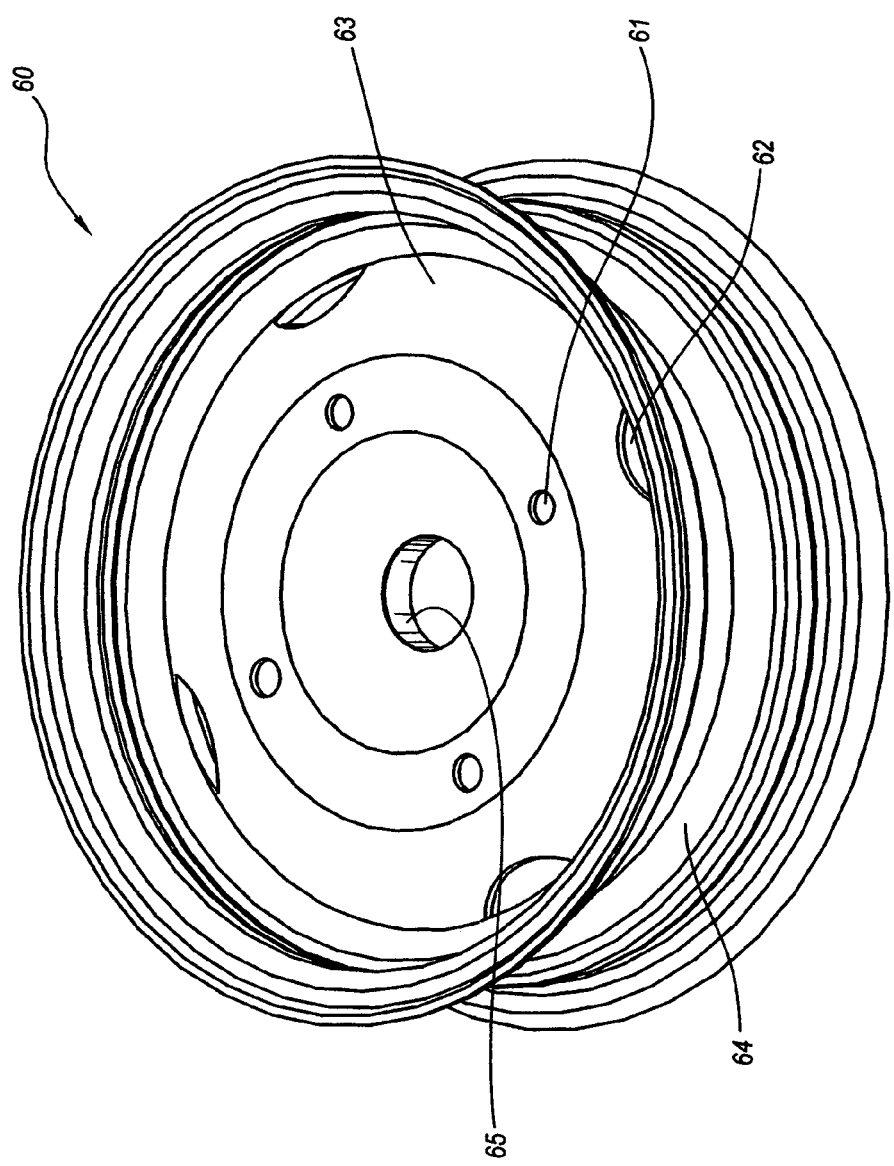
FIG. 3 shows a top plan perspective view of the wheel of FIG. 2E.

In a practice of the process of the invention for forming a wheel 60 like that shown in FIG. 2E and 3, FIG. 2B shows that mold 10 is covered by the dome shaped lid 20 fitted thereover, with a pour of a mixture of urethane materials 40 flowing through the tube 35 and passing into the cylindrical container. During which mixture flow, a deep vacuum, shown by arrows C, is pulled through the cylindrical canister 30 and through vacuum fitting 38. Which flow continues until a proper amount of the urethane mixture has passed into the cylindrical canister, as observed through the window 39 that has been measured to provide enough material to form a single rim 60. With, in preparation to initiating a flow of which urethane material from the cylindrical canister 30, a low level vacuum is shown pulling air, arrow B, from under the dome shaped lid 20 with that flow passing through the vent fitting 22, also illustrated by arrow B.

FIG. 2C shows the mold 11 with the cylindrical canister 30 of FIG. 2B fitted therein and with the actuator rod 32 shown as having been moved vertically, as by operation of a solenoid, not shown. The needle valve head 33 is thereby lowered out of engagement with the valve seat 34, opening the needle valve 31 to pass the urethane mixture. Simultaneous with the needle valve 31 opening, the cylindrical cylinder vacuum fitting 38 is opened, allowing air at atmospheric pressure, shown as arrows D, to enter the cylindrical canister, above the urethane material 40, that also begins flowing out of the needle valve 31. The urethane material flow is exhausted through a vent opening 42 in the bottom of the cylindrical canister 30 and travels through a flow path through the mold, identified by arrows E. The urethane material flow, pulled by the low level vacuum, travels first through radial channels 16 that are located at the junction of the bottom plate top surface 12b and the bottom plate mold segment 15. As shown in FIG. 2A through 2d, the cylindrical canister vent opening 42 aligns with the radial channels 16 that, in turn, connect to feed the urethane material into that mold wheel cavity 19b at a lower flange end 43 of mold rim flange 44. Thereafter, the urethane material flow 40, shown as arrows E in FIG. 2C, under the urging of the low level vacuum, travels up the mold rim flange to branch off at the intersection 45 of the mold rim flange 44, forming two flows that proceed separately, one across the mold rim flange 44 to the upper flange end 46, and the other across the rim center section 47 to an upwardly turned mold wheel hub 48. A flow passage 49 connects to an end 48a of which mold wheel hub 48. Which flow passage 49 extends alongside the cylindrical canister outer surface 30a to pass material to the edge of the top plate center opening 14. FIG. 2D, as set out above, shows the flow path, arrows E, of the urethane material as it travels through the mold rim cavity, diverging at intersection 45, with the two flows pulled into the dome shaped lid 20 inner cavity, and pass out of the passages 50 from the mold rim cavity upper flange end 46 and vent along the cylindrical canister 30a towards the hole 14 edge. Shown in FIG. 2D, the urethane material presence within the dome shaped lid 20 inner cavity ends of the passages 50, arrows F, and at the hole 14 edge indicates that the mold rim cavity is filled with the urethane material and that the urethane material flow should be stopped. Which urethane material flow is stopped by release of the low level vacuum, arrow G, at vent fitting 22, and shutting off of the needle valve 31. The needle valve 31 closure occurs after the measured amount of the urethane material has passed out of the cylindrical canister and prior to the end of that flow entering the mold rim cavity at the lower flange end 43, filling the mold rim cavity, as shown in FIG. 2D.

In which mold rim cavity filling the flow of urethane material flows around rim lug hole plugs 51 that are fitted at spaced radial increments into the bottom plate mold segment 15, leaving appropriately positioned lug holes 61 in the finished rim 60, as shown in FIGS. 2E and 3. Further, as shown in broken lines in FIGS. 2C and 2D, a section 47a of the rim center section 47 is shown in broken lines to indicate that the bottom plate mold segment 15 also has spaced closed sections wherearound the urethane flow passes, leaving spaced circumferential voids 62, as shown in the finished rim 60 of FIGS. 2E and 3, at the junction of a rim center portion 63 and a rim web area 64 and includes a center hub hole 65. Which finished rim 60 is formed entirely of urethane. It should, however, be understood that the rim 60 can have circumferential sections or portions thereof that are of different thickness or thicknesses to support an anticipated wheel loading, within the scope of this disclosure. FIG. 3 shows a top perspective view of the rim 60 of FIG. 2E.

Figure 4A:
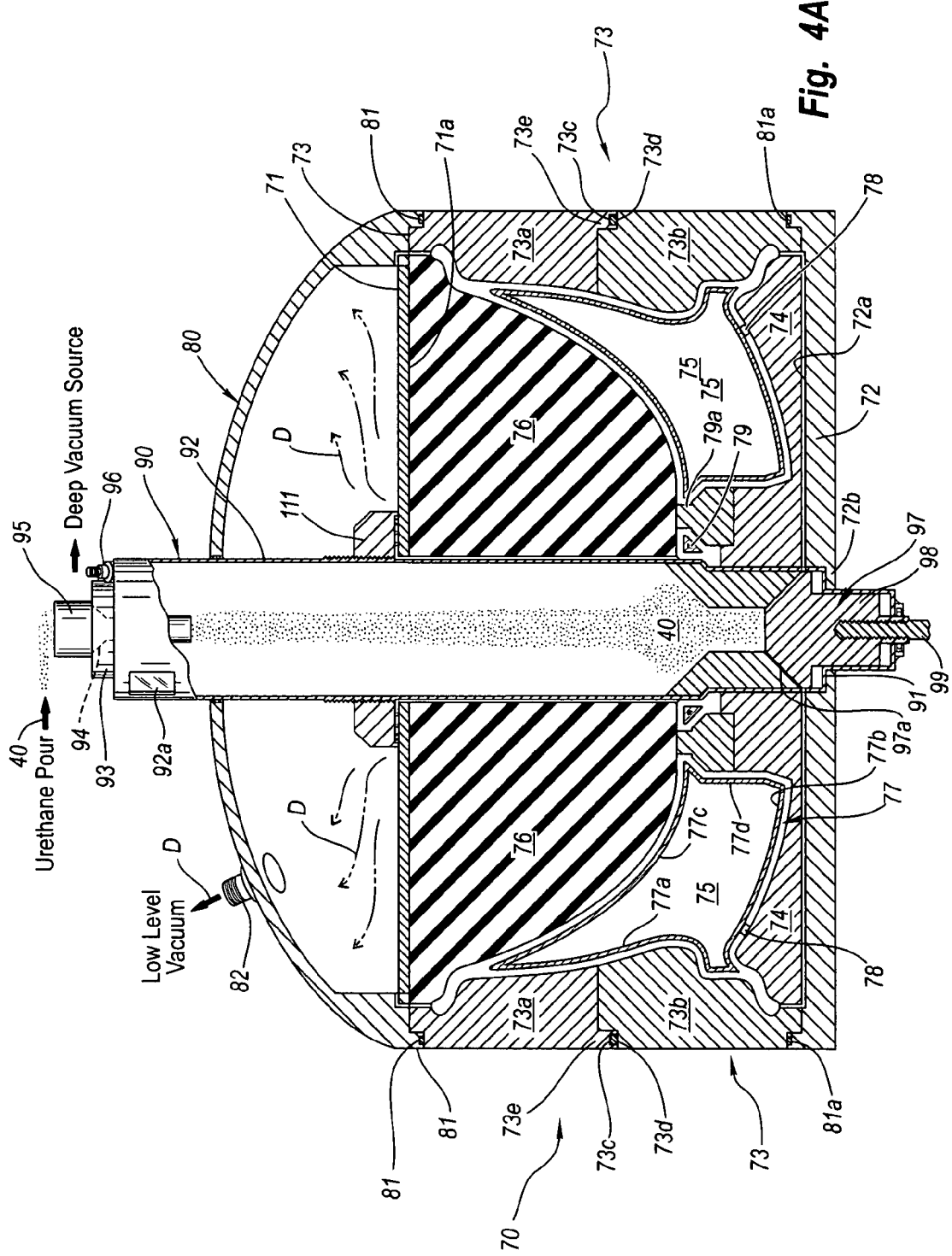
FIG. 4A shows a view like that of FIG. 2C with a pour of urethane material passing into a cylindrical canister that is under a deep vacuum, arrow C, pulling air out of the mixture of urethane constituents, showing the canister lower end as including a closed needle valve and showing a cavity mold like that of FIGS. 2A through 2D wherein a wheel core has been positioned, with a dome shaped lid shown fitted over the mold top plate that is under a low level vacuum, show as arrows D, that is pulled through a dome port.
Figure 4B:
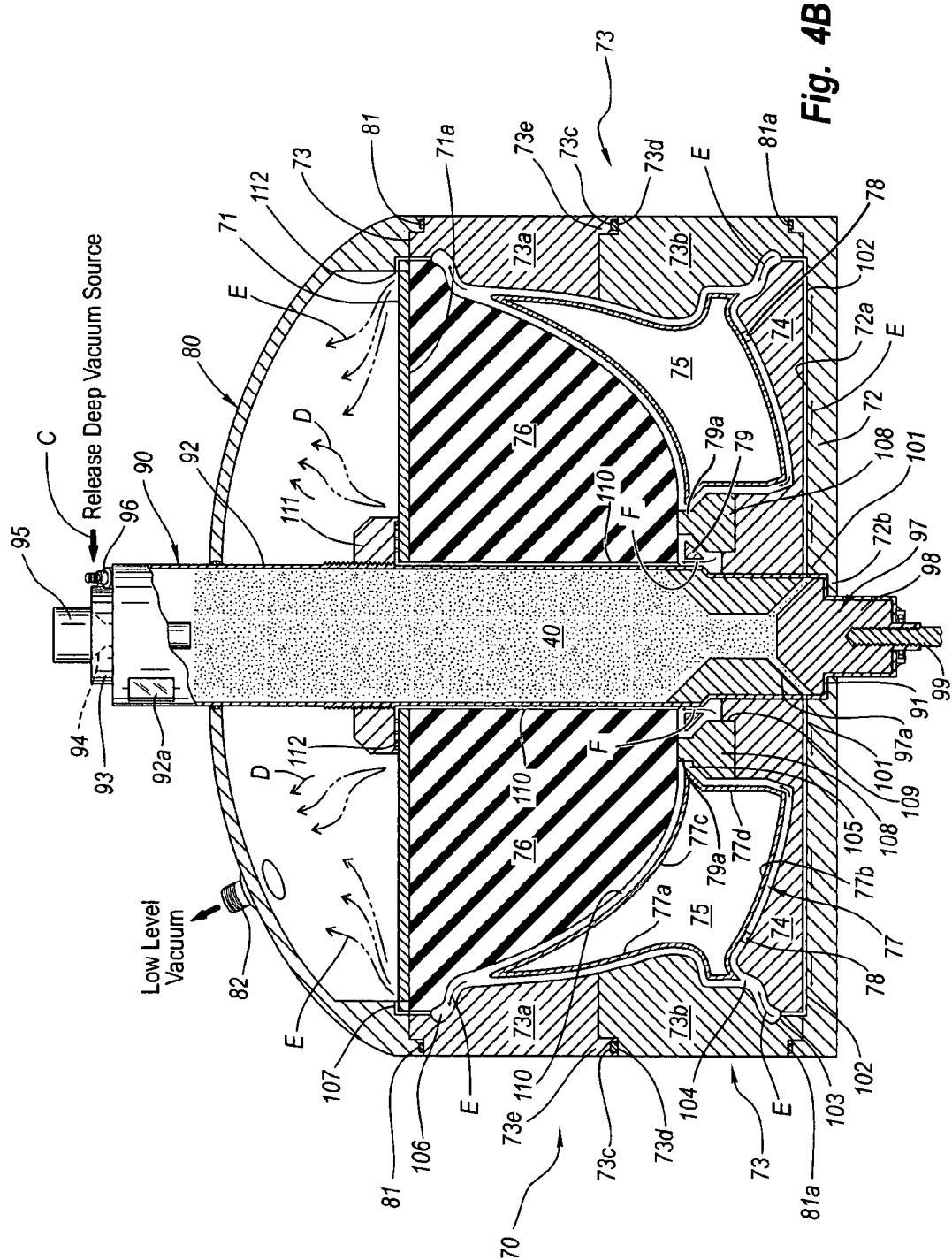
FIG. 4B shows a view like that of FIG. 4A showing the needle valve as having been opened, opening the mold cavity to a flow of the urethane material passed from the needle valve, arrows E, under the urging of the low level vacuum that is pulled through the dome port, arrows D.
Figure 4C:
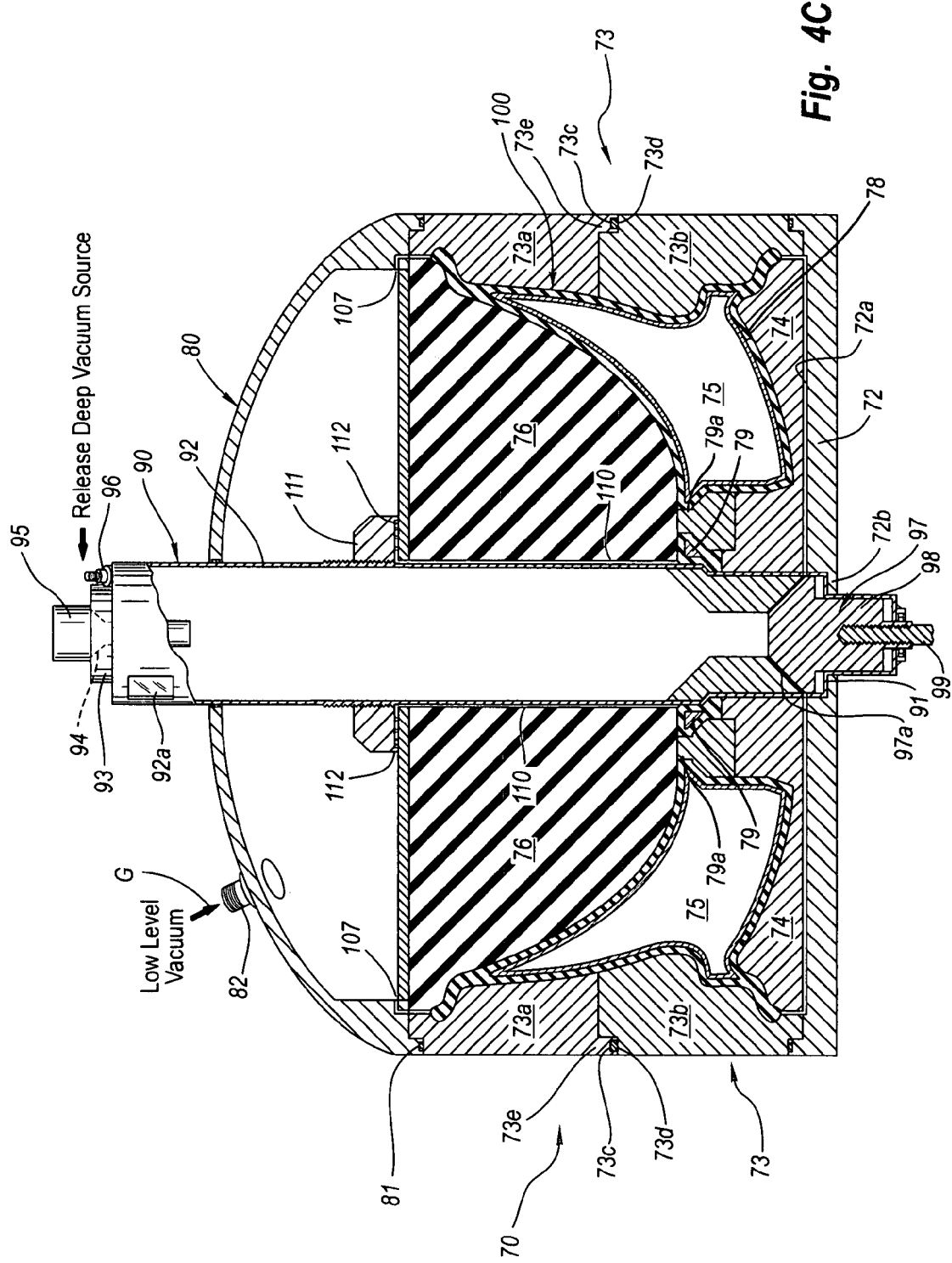
FIG. 4C shows a view like that of FIG. 4B showing the urethane mixture as having passed into the mold rim cavity, filling the mold rim cavity and covering the wheel core, and showing the needle valve as having been closed, cutting off the urethane material flow.

FIGS. 4A, 4B and 4C are views like those of FIGS. 2B, 2C and 2D only they show a wheel 100 having a wheel core 77 that is encapsulated within a urethane material in a vacuum forming apparatus. FIG. 4A, like FIG. 2B, shows a mold 70 that includes top and bottom plates 71 and 72, respectively, with a top surface 72a of the bottom plate 72 shown as mounting a bottom plate mold segment 74 having a lower portion of a wheel core 75 formed therein and includes a ring seal 81a for engaging and sealing against an outer mold segment ring 73. Which outer mold segment ring 73 is formed by a pair of half ring outer mold segments 73a and 73b that are for fitting together into a ring 73 that is positioned onto an outer edge portion of the bottom plate 72 top surface 72a, sealing at ring seal 81a. The half ring outer mold segments 73a and 73b include a ring seal 73c for fitting in a circular slot 73d in an edge of the half ring outer mold segment 73b, opposite to a toe end 73e of the half ring mold segment 73a, sealing the half ring outer mold segments 73a and 73b against an outward flow of urethane material. The ring seal 81a is to preclude a urethane material flow across a toe edge 81 of the top plate 71. Which top plate undersurface 71a mounts a top plate mold segment 76 that has the shape of the upper portion of the wheel core cavity 75. Accordingly, the inner surfaces of the lower and upper plate mold segments, and the ring shaped mold outer mold segment 74, 76 and 73, respectively, form the wheel core cavity 75 that receives a preformed urethane wheel core 77, that is cast therein by operation of the vacuum forming apparatus, as set out below. Which wheel core 77 is slightly smaller than the mold wheel core cavity 75, leaving a urethane material flow path therearound, and is positioned in that wheel core cavity by standoffs 78 that approximately center the wheel core 77 in the wheel core cavity 75. Which wheel core 77 is shown in 4A through 4C and 5 as being a hollow ring shaped tube that is positioned in the mold to be centered on the wheel hub 79 and has a cross section to transmit forces as are applied at the wheel through a saddle 77a and flange ends 77e, through wheel inner and outer sections 77b and 77c, respectively and into the wheel drum section 77d and the wheel lug holes. The wheel core 77 is shown as having the saddle 77a between the flange ends 77e and joins to the inner and outer sections 77b and 77c that join to the ends of the drum section 77d that has the shape of an axle drum. The wheel core 77 is hollow and, accordingly, in the vacuum forming operation, only the outside of the wheel core 77 will be coated. Which finished wheel with wheel core 77 is shown as a urethane wheel 100 in FIGS. 4C and 5 and discussed hereinbelow.

Figure 5:
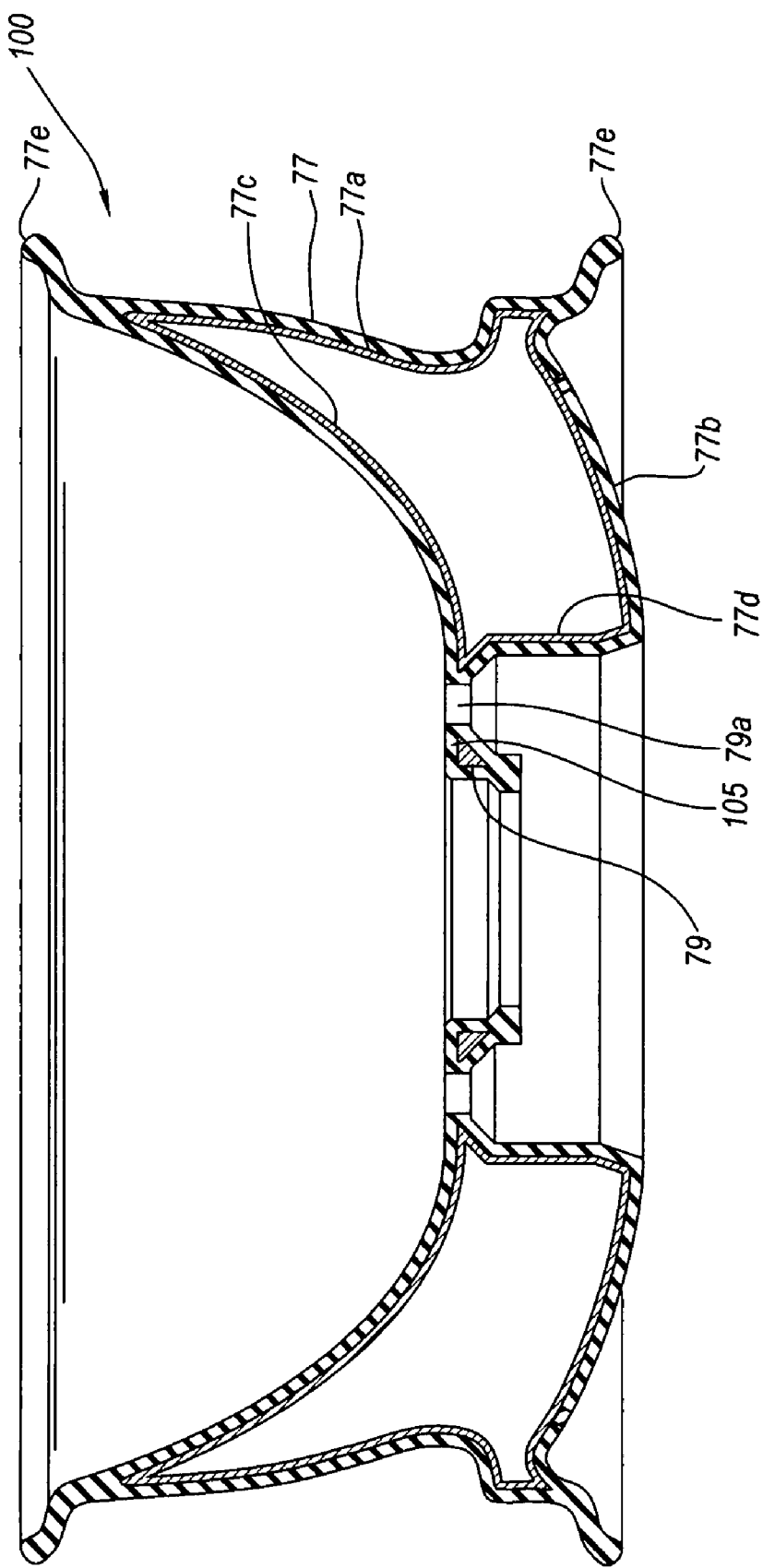
FIG. 5 shows a side elevation sectional view of a wheel removed from the mold of FIG. 4C, showing the wheel core cover by a layer of hardened urethane and the low level vacuum as having been released, arrow G.
Figure 6:
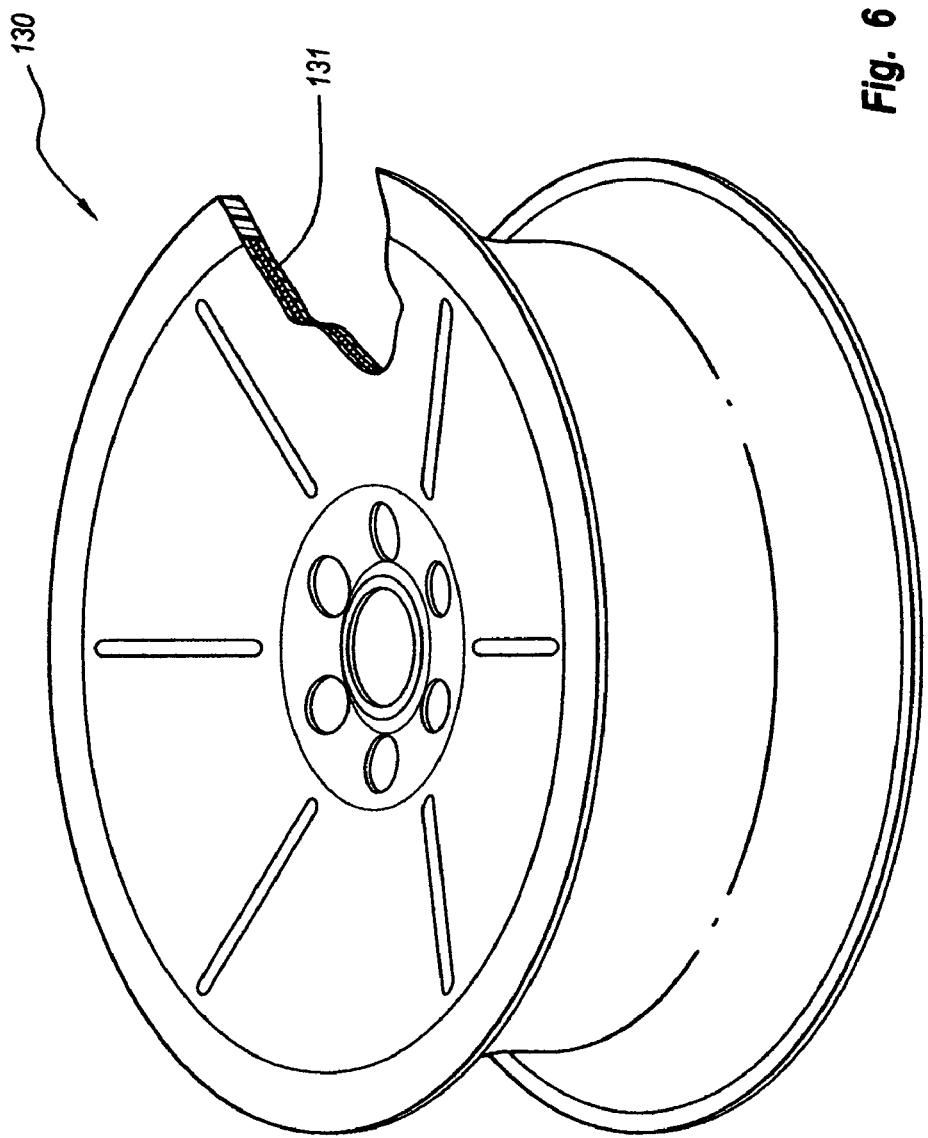
FIG. 6 shows a top plan perspective view of a wheel where the urethane mixture has been directed around, to encapsulate, the wheel core, that is shown as a removed section.

While a hollow ring shaped tube is shown as the wheel core 77 in FIGS. 4A through 4C and 5, it should be understood that another design of core, such as a core formed to fit within and be supported as with standoffs in the cavity of mold 10, can be provided. Such core is also to receive a flow of the urethane mixture to coat both core sides. In such arrangement the core is fully encapsulated in the urethane mixture. Such core can be formed of a light gauge steel or aluminum to provide a stiffening to the rim. FIG. 6 shows a top plan perspective view of a wheel 130 that has had a section removed back from a top flange end portion to expose such a core 131 that the wheel is cast around in a practice of the vacuum forming steps and in the apparatus as described above.

In a practice of the process of the invention, as shown in FIG. 4A, the mold 70, like the mold 10 of FIG. 2B, has a mold dome shaped lid 80 fitted over the top plate 71, with a ring seal 81a providing sealing of the dome shaped lid 80 outer circumference at foot 81 onto the top of the ring shaped outer mold segment 73 and shows a low level vacuum, arrows D, being pulled through a vent fitting 82. The cylindrical canister 90 is shown fitted through the center of mold 70 with a stepped lower end 91 thereof shown resting on a lip 72b of the lower plate 72. The cylindrical canister 90, like the cylindrical canister 30, is shown as having a cylindrical body 92, and has its top end covered by a cap 93 that has a funnel shaped opening 94, shown in broken lines, formed through the center thereof. Which funnel shaped opening 94 receives a feed tube or pipe 95 and includes vacuum fitting 96 formed through the cap 93 that a deep vacuum, arrow C, is being pulled through.

In FIG. 4A, like FIG. 2B, a urethane material mixture 40 is poured into the cylindrical canister 90 through feed tube or pipe 95 to pass through the funnel shaped opening 94. Which mixture, during pouring, is subjected to the deep vacuum, removing essentially all air as is present in the urethane material mixture. During which pouring a valve head 98 of a needle valve 97 that is positioned across the cylindrical canister 90 lower end is urged upwardly by an actuator rod 99 into seating engagement within a needle valve seat 97a, maintaining the needle valve 97 in a closed state.

FIG. 4B shows the cylindrical canister 90 of FIG. 4A filled with the urethane mixture wherefrom essentially all entrapped air has been removed. Thereafter, the deep vacuum is removed and the vacuum fitting 96 is opened to atmosphere, releasing the deep vacuum. Simultaneously, the needle valve 97 is opened, allowing the air free urethane mixture to flow out of vent openings 101 that communicate with radial channels 102 that connect to a lower flange end 103 of the mold wheel cavity. The urethane flow, shown as arrows B, branches at a mold cavity junction 104 proceeding both alongside the wheel saddle 77a and across the inner section 77b, respectively, of the wheel core 77. Which urethane material flows alongside the wheel core inner section 77b, then flows along the core wheel drum section 77d and branches at a junction with a wheel cavity hub portion 105 and the core outer section 77c to flow along the wheel core outer section 77c and intersect the flow that has crossed the wheel core saddle 77b, and around lug plugs 108 to the wheel cavity hub portion 105 that becomes the wheel hub portion 105. Whereafter, the combined flows proceed through the wheel cavity upper flange 106 and vent out of passages 107 into the dome shaped lid 80. Simultaneously, the urethane material travels into the wheel cavity hub portion 105, flowing around lug plugs 108, to a wheel hub 109, venting, shown as arrows F, up a cylindrical canister out wall passage 110 that bends at a right angle around a collar 111 and also vents at 112 into the dome shaped lid 80.

FIG. 4C shows the urethane material as having been pulled by the low level vacuum, arrows E, with a first venting of the urethane material out of the passages 107 and 112 indicating that the mold wheel shaped cavity is filled. Whereupon, the low level vacuum that is pulled through the vacuum fitting 82 is released, allowing air at atmospheric pressure, arrow G to enter the dome shaped lid 80, completing the formation of the urethane wheel with core 100, as shown in FIG. 5.

After curing, the mold 70 is broken apart, with the dome shaped lid 80 removed first, followed by the top plate 71 and the top plate mold segment 76 and the half ring outer mold segments 73a and 73b are separated The wheel urethane wheel with core 120 is then removed off from the bottom plate lower plate mold segment 74 that is pulled over the cylindrical canister 90. Which urethane wheel with core 100 is shown as a side elevation sectional view in FIG. 5.

In practice, a deep vacuum that is at least ninety six (96) percent is pulled through cylindrical canister vacuum ports 38 and 96, pulling air out from the cylindrical canister, as illustrated by arrow C, and a low level vacuum of at least eighty five (85) percent, and not greater than ninety five (95) percent, is pulled through vent fittings 22 and 82 of the dome shaped lids 20 and 80 of the two apparatus embodiments, as set out above. Thereafter, a urethane material 40 that has been recently mixed from constituents, is poured through tubes 35 and 95 through the cylindrical canisters 30 and 90 tops, with the deep vacuum removing air from that urethane material mixture. Whereafter, when a desired volume or weight of urethane material has been poured into the cylindrical canister, the high level vacuum is terminated and the canister is opened to atmosphere through the vacuum ports 38 and 96. Simultaneously to opening the canister to atmosphere the needle valve 31 and 97 are opened, and the urethane material is passed into the mold, traveling through and filling the mold cavity, with the needle valve then closed prior to a passage of air from the canister that following the urethane material. An operator seeing through the canister windows 39 and 92a, or by other sensing apparatus, that the urethane material is venting from the mold top plate, closes the needle valve, if it has not already been closed, to prevent air passage into the mold cavity, and ends the low level vacuum draw through the top plate ports. The newly formed wheel is allowed to cool and cure in the mold, with the mold then broken open and the wheel removed.

While preferred embodiments of our invention in a vacuum forming apparatus for forming a urethane wheel in a single operation, have been shown and described herein, it should be understood that variations and changes are possible to the apparatus and method for its use in the formation of the described tire, and the materials used, without departing from the subject matter coming within the scope of the following claims, and a reasonable equivalency thereof, which claims we regard as our invention.

We claim:

1. A composite wheel comprising:
    urethane wheel portion comprising, a hub having a central opening, a mid-section having lug holes that are spaced radially outward from the central opening, and a rim section comprising a rim center and inner and outer tire bead retaining flanges made entirely of urethane material;
    a steel or aluminum wheel core comprising a hub having a central opening, a mid-section having lug holes that are spaced radially outward from the central opening, said mid-section extending radially outward to form a web section;
    wherein said composite wheel has a finished size and is formed with said urethane wheel portion completely covering said wheel core, the outer surfaces of the urethane wheel portion corresponding to said finished size, said wheel core having size dimensions which are less than the finished size of the composite wheel, and said wheel core supporting said rim center of said urethane portion and not extending into said tire bead retaining flanges of said urethane wheel portion.

2. The urethane wheel as recited in claim 1, wherein the wheel core is encapsulated in the wheel during a vacuum forming operation.

3. The urethane wheel as recited in claim 2, wherein the wheel core formed from steel or aluminum has a selected thickness to provide, when encapsulated in the cured urethane, a desired stiffening to the wheel to equal or exceed a load support capability of a conventional steel or aluminum wheel.

4. The urethane wheel as recited in claim 3, wherein the wheel core is supported, to be essentially centered, in a mold cavity having the shape of the wheel to be molded therein to allow for a free flow or urethane materials therearound, providing a uniform thickness of cured urethane materials around said wheel core.

5. The urethane wheel as recited in claim 4, wherein the wheel core is formed as a hollow ring shaped tube and is positioned in the mold cavity to receive a coating of urethane material uniformly applied over its outer surface.

6. The urethane wheel as recited in claim 4, wherein the wheel core receives coatings of urethane material over its surfaces, encapsulating said wheel core within the urethane wheel.

* * * * *